L. R. HOUCHENS.
LAWN SWING.
APPLICATION FILED OCT. 13, 1921.
1,416,560.
Patented May 16, 1922.
2 SHEETS—SHEET 1.
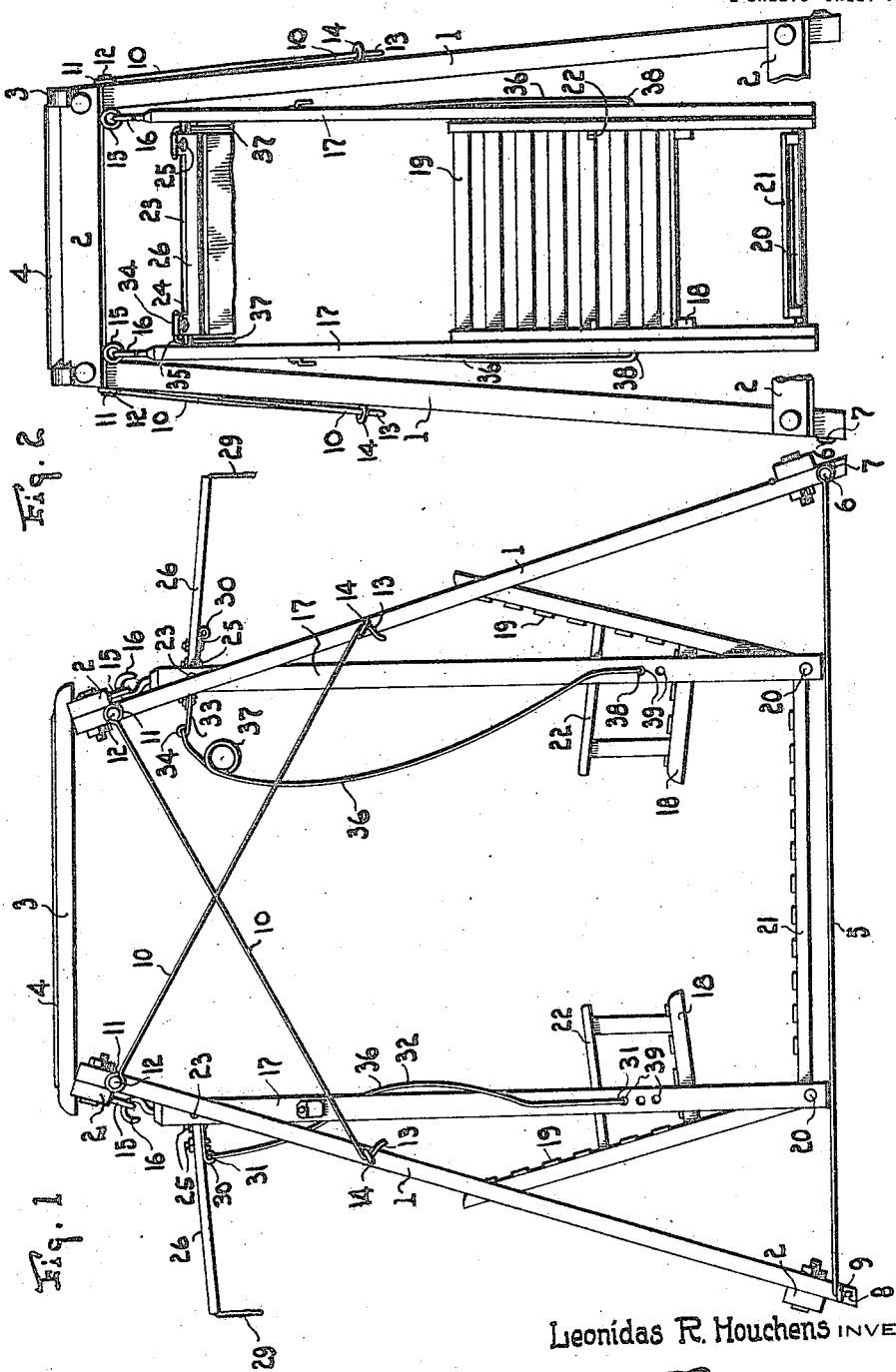
Leonidas R. Houchens INVENTOR
WITNESSES
Frank B. Cook
F. F. Chapman
BY
ATTORNEY

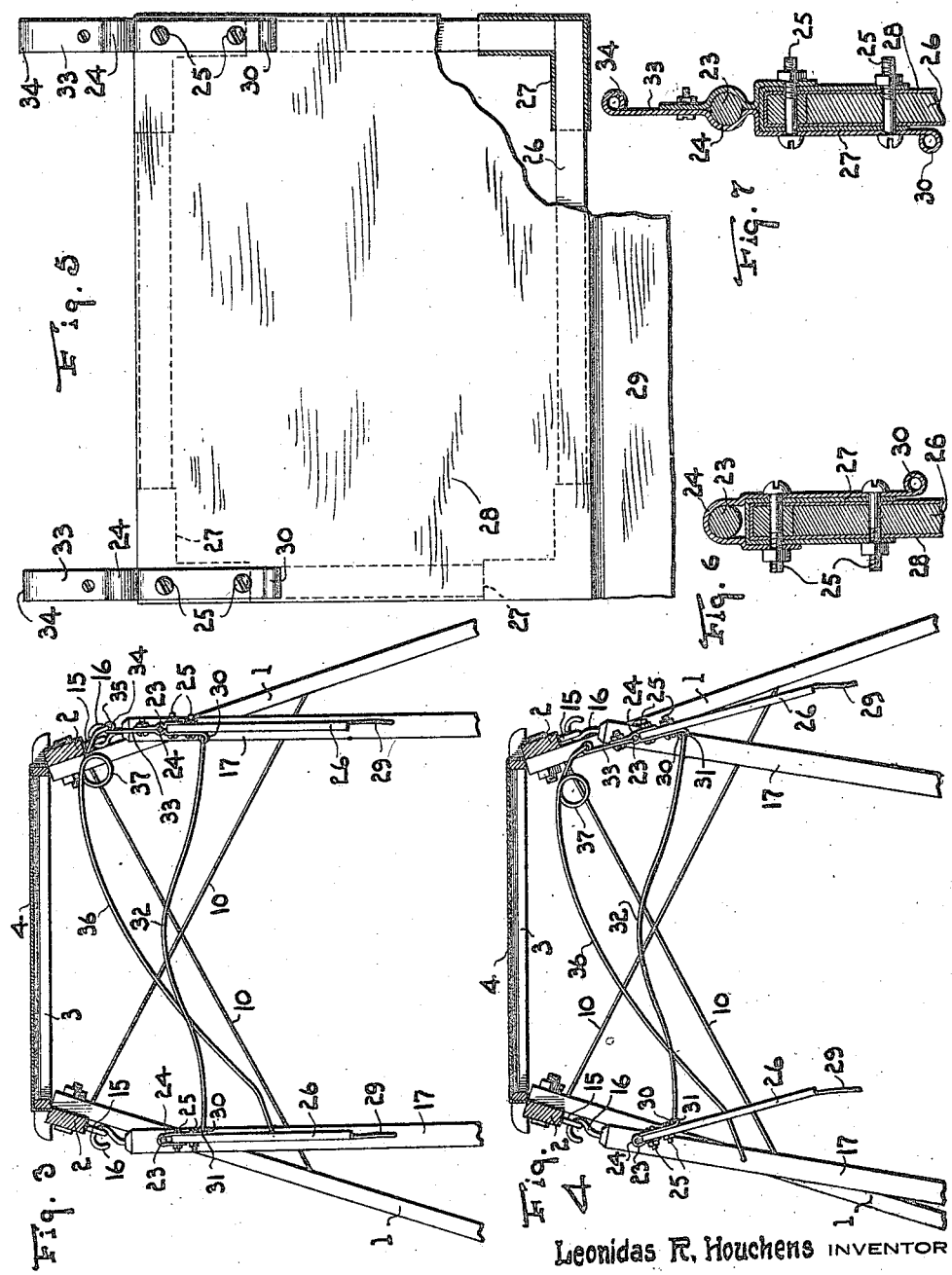

UNITED STATES PATENT OFFICE.

LEONIDAS R. HOUCHENS, OF WASHINGTON, DISTRICT OF COLUMBIA.

LAWN SWING.

1,416,560.      Specification of Letters Patent.      Patented May 16, 1922.

Application filed October 13, 1921. Serial No. 507,427.

*To all whom it may concern:*

Be it known that I, LEONIDAS R. HOUCHENS, a citizen of the United States, residing at Washington, District of Columbia, have invented a new and useful Lawn Swing, of which the following is a specification.

This invention has reference to lawn swings, and its object is to provide for the agitation of the air caused by the movement of the swing, the general construction of the swing corresponding in the main to the customary type of lawn swings.

In accordance with the invention, the lawn swing comprises a frame made up of bars connected together so as to form an upright support containing oscillatory seats hung from overhead pivot members connected together for oscillation, and so arranged as to actuate fan members by the swinging of the seats, or permitting the fan members to be used as sunshades instead of fans, so that in the event of the lawn swing being located in a position where subjected to sunshine, the occupants of the seats are either protected from the direct rays of the sun, or, if so desired, the occupants of the seats are subjected to agitation of the air and are thereby cooled.

The arrangement is such that the fans may be agitated to different extents, or the fan on one side of the structure may be stilled for shading purposes, while that on the other side of the structure may be oscillated, so that the occupants of the structure may be protected from sunshine, and may be cooled by the agitation of the fan on the other side of the structure.

Moreover, the mechanism employed may be adjusted to different degrees for accommodation to different conditions.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Fig. 1 is a side elevation of a lawn swing with the invention applied, and having the fans adjusted as sunshades.

Fig. 2 is an end elevation of the structure of Fig. 1, with some parts broken away.

Fig. 3 is a more or less fragmentary view with parts in longitudinal section, showing the arrangement of the fans for oscillation by the to-and-fro movements of the swinging elements.

Fig. 4 is a similar view but showing the swinging elements in a different phase of operation.

Fig. 5 is a fragmentary view, on a larger scale, of one of the fan elements.

Fig. 6 is a detail section through one side of the fan structure.

Fig. 7 is a similar section taken through the other side of the fan structure.

Referring to the drawings, there are shown upright bars or posts 1 spread apart, both laterally and longitudinally, at the basic portion and approaching toward the upper portion. These bars, constituting the main frame of the structure, are connected together top and bottom by brace strips 2, bolted, or otherwise secured, to the bars. The bars 1 and strips 2 are united at the top by other brace strips 3, and by a connecting roof portion 4, and the bottoms of the posts 1, are united by rods 5, each connected to a respective post 1 by a pin 6 and eye 7 and united to the companion post 1 on the other side of the lawn swing by a hook 8 and eye 9, this arrangement facilitating the dismantling of the structure and the ready assemblage thereof, and also facilitating the packing and shipping of the lawn swing.

The lawn swing is further braced by crossed rods 10 near the top, each rod 10 having an eye 11 at one end engaging a pin 12 projecting from a respective post 1, and a hook 13 at the other end of the rod adapted to engage an eye 14 on the respective post 1. In this manner, the main frame of the swing is firmly braced for assemblage or dismantling without any interference with the oscillatory parts of the swing.

Each cross bar 2 at the top of the swing carries an eye 15 engaged by a hook 16 clasped to the upper end of an upright bar 17 designed to swing back and forth between the bars 1. The bars 17 constitute swing frames supporting swing seats 18, such as are commonly employed in lawn swings, each seat having a slatted back 19 rising from a supporting rod 20. Extending beween the rods 20 is a foot rest 21 also of slatted construction and uniting the bars 17, all in a manner common to lawn swings. To complete the lawn swing for the accommodation of the user, arm supports 22 are provided.

The bars 17 hung at their upper ends upon the hooks 16 and united at the lower ends by the foot rest 21 and pivot rods 20 constitute a parallel motion structure common to lawn swings.

With such an arrangement the seats 18 may be readily swung back and forth on the hooks 16 to impart the ordinary oscillatory movement. The parts already described may be of common construction and do not in themselves impart any novelty to the swing structure and require no further description.

Extending between the bars 17 on each side of the swing and adjacent to the upper ends of these bars, are rods 23 surrounded by clips 24 capable of rocking movements on the rods 23. The clips are traversed by bolts 25 and the bolts in turn traverse strips 26 united by the bolts 25 to said strips.

The strips 26 are seated at the ends in angle sockets 27 so that there is produced a skeleton frame made up of the strips 26 and sockets 27. The frames are covered by fabric 28 producing a fan structure having along the lower edge a flexible extension 29 capable of agitating the air when the fan structure is rocked about the pivot support made up of the rod 23 and clips 24.

Each clip 24 is provided with an eye extension 30 capable of receiving the corresponding end 31 of a brace rod 32 long enough to join one fan on one side of the structure to another fan on the other side of the structure, whereby the two fan structures may be made to move together, when the swing is oscillating.

Each clip 24 on one side of the swing structure is provided with an upstanding extension 33 best shown in Fig. 7, and each clip 24 terminates in an eye 34. Engaging in the eye 34 is the hook end 35 of a rod 36 including a coil 37 near the hook 35 to permit an elastic bending of the rod 36. The other end of the rod 36 terminates in a hook 38 capable of entering a perforation 39 in one or the other of the bars 17 of one or the other of the swing structures. Each fan structure has a rod 36 individual thereto and capable of connecting the two fan structures so that they may operate in unison as the swing structures oscillate as shown in Figs. 3 and 4, or be engaged in some one of the perforations 39 in the side members 17 of the swing structure, the latter arrangement resulting in tipping the fan members 26 so as to override the seats of the swing in order to protect the occupant from the effects of sunshine.

The fan structures 26 have, therefore, two functions, one being to protect the occupants of the seat 18 from the effects of sunshine, and the other being to agitate the air over the seats in order to fan the occupants as the swings oscillate.

What is claimed is:—

1. In a lawn swing, swing structures capable of simultaneous oscillation, a fan structure for each swing structure pendently mounted thereon at the upper portion of said swing structure, connecting rods individual to the fan structures for connecting the fan structures in operative relation with the swing structures, and means whereby the rods may connect each fan to the swing structure on which it is mounted to cause the fan structure to serve as a stationary sunshade.

2. In a lawn swing, swing structures capable of simultaneous oscillation, a fan structure for each swing structure pendently mounted thereon at the upper portion of said swing structure, connecting rods individual to the fan structures, and means whereby the rods may connect each fan to the swing structure on which it is mounted to cause the fan structure to operate as a stationary sunshade, said means being constructed to connect the fan structures for joint oscillation to agitate the air as the swing structures oscillate.

3. In a lawn swing, oscillatory swing structures joined for like movements, a sunshade mounted on each swing structure, connecting rods between the sunshades and means connecting one of the sunshades with a swing structure to cause the sunshades to rock by the swinging movements of the swing structures in a direction which is opposite to the direction of the movements of the swing structures and thus agitate the air to cool the occupants of the swing.

4. In a lawn swing, oscillatory swing structures joined for like movements, a sunshade mounted on each swing structure, and connecting rods between the sunshades to cause them to rock by the swinging movements of the swing structures and thus agitate the air to cool the occupants of the swing, the swing structures and the rods having coacting parts for varying the oscillatory movements of the sunshades, for controlling the extent of the oscillatory movements in their cooling action upon the occupants of the swing, said connecting rods between the sunshades adapted to connect with the swing structures for maintaining the sunshade in a horizontal stationary position.

5. In a lawn swing, oscillatory swing structures joined for like movements, a sunshade mounted on each swing structure, means for connecting one of the sunshades with an opposite swing structure whereby said sunshade is oscillated, connecting rods between the sunshades to cause them to rock by the swinging movements of the swing structures, said rods adapted to connect the sunshades with a stationary part of the swing structures whereby the sunshades are held substantially stationary as the swing structures oscillate.

6. In a lawn swing, pendent swing structures connected for simultaneous swinging movements in a stationary supporting structure, sunshades pivotally hung from respective swing structures and provided with connecting rods having interchangeable connections between the sunshades and the supporting structures whereby the sunshades may be connected by the rods to the swing structures and oscillated and thus produce air currents or connected to the stationary structure to serve as sunshades irrespective of the oscillatory movements of the swing.

In testimony that I claim the foregoing as my own, I have hereto affixed my signature.

LEONIDAS R. HOUCHENS.